United States Patent
Stubenvoll et al.

(10) Patent No.: US 11,130,383 B2
(45) Date of Patent: Sep. 28, 2021

(54) ROLL STABILIZER FOR A MOTOR VEHICLE

(71) Applicant: SCHAEFFLER TECHNOLOGiES AG & CO. KG, Herzogenaurach (DE)

(72) Inventors: Maximilian Stubenvoll, Fürth (DE); Sven Brückner, Fürth (DE); Stephan Klotz, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/639,645

(22) PCT Filed: Jun. 12, 2018

(86) PCT No.: PCT/DE2018/100556
§ 371 (c)(1),
(2) Date: Feb. 17, 2020

(87) PCT Pub. No.: WO2019/034197
PCT Pub. Date: Feb. 21, 2019

(65) Prior Publication Data
US 2020/0238785 A1    Jul. 30, 2020

(30) Foreign Application Priority Data
Aug. 17, 2017 (DE) .......................... 102017118790.1

(51) Int. Cl.
*B60G 21/055* (2006.01)
*B60G 17/019* (2006.01)

(52) U.S. Cl.
CPC ....... *B60G 21/0555* (2013.01); *B60G 17/019* (2013.01); *B60G 2202/135* (2013.01);
(Continued)

(58) Field of Classification Search
CPC .............. B60G 21/0555; B60G 17/019; B60G 2202/135; B60G 2202/42;
(Continued)

(56) References Cited

U.S. PATENT DOCUMENTS

| 5,142,475 | A | * | 8/1992 | Matsunaga | ...... | B60G 17/01941 |
| | | | | | | 280/5.504 |
| 5,175,687 | A | * | 12/1992 | Tsutsumi | ......... | B60G 17/01941 |
| | | | | | | 280/5.515 |

(Continued)

FOREIGN PATENT DOCUMENTS

| DE | 102005055171 A1 | 6/2006 |
| DE | 102009028386 A1 | 2/2011 |

(Continued)

OTHER PUBLICATIONS

Anonymous, "AS5050A Low Power 10-Bit Magnetic Position Sensor", Oct. 14, 2014, pp. 1-31.

*Primary Examiner* — Frank B Vanaman
(74) *Attorney, Agent, or Firm* — Dickinson Wright PLLC

(57) ABSTRACT

An electromechanical roll stabilizer for a motor vehicle includes a housing, a rotor position sensor board, and an actuator torque sensor board. The housing has a motor unit that has a stator and a rotor integrated therein. The rotor position sensor board and the actuator torque sensor board are arranged between two stabilizer halves. The actuator torque sensor board has a digitization and transmission unit for digitizing the sensed torque and transmitting the digitized torque to a data forwarding module arranged on the rotor position sensor board. The rotor position sensor board has a rotor position detection unit for sensing and digitizing the rotor position and a data processing unit. The sensing of the rotor position can be triggered by at least one command signal of a controller to the rotor position detection unit. The (Continued)

data processing unit is provided to process the sensed measured values.

6 Claims, 2 Drawing Sheets

(52) U.S. Cl.
CPC .... *B60G 2202/42* (2013.01); *B60G 2206/427* (2013.01); *B60G 2400/98* (2013.01); *B60G 2600/187* (2013.01)

(58) Field of Classification Search
CPC .......... B60G 2206/427; B60G 2400/98; B60G 2600/187; B60G 2600/77
See application file for complete search history.

(56) References Cited

U.S. PATENT DOCUMENTS

| | | | |
|---|---|---|---|
| 6,425,585 B1* | 7/2002 | Schuelke | B60G 17/0162 280/124.106 |
| 2006/0190155 A1* | 8/2006 | Meyer | F16H 61/0006 701/54 |
| 2008/0106055 A1* | 5/2008 | Pinkos | B60G 3/20 280/124.106 |
| 2008/0221757 A1* | 9/2008 | Ketteler | B60G 17/019 701/37 |
| 2009/0091093 A1* | 4/2009 | Urababa | B60G 17/0162 280/5.511 |
| 2009/0091094 A1* | 4/2009 | Sano | B60G 21/0555 280/5.511 |
| 2015/0151604 A1* | 6/2015 | Park | F16H 1/28 280/124.106 |
| 2016/0311285 A1* | 10/2016 | Plettner | B60G 21/055 |
| 2019/0381851 A1* | 12/2019 | Groger | G01B 7/14 |

FOREIGN PATENT DOCUMENTS

| | | |
|---|---|---|
| DE | 102011078819 A1 | 4/2012 |
| DE | 112010002715 T5 | 7/2012 |
| DE | 102013221248 A1 | 4/2015 |
| DE | 102014213324 A1 | 1/2016 |
| EP | 1362721 A2 | 11/2003 |
| EP | 1820675 A1 | 8/2007 |
| EP | 1821390 A2 | 8/2007 |
| WO | 2007054489 A1 | 5/2007 |

* cited by examiner

ROLL STABILIZER FOR A MOTOR VEHICLE

CROSS-REFERENCE TO RELATED APPLICATIONS

This application is the U.S. National Phase of PCT/DE2018/100556 filed Jun. 12, 2018, which claims priority to DE 10 2017 118 790.1 filed Aug. 17, 2017, the entire disclosures of which are incorporated by reference herein.

TECHNICAL FIELD

This disclosure relates to an electromechanical roll stabilizer for a motor vehicle, having a first stabilizer half and a second stabilizer half, wherein a housing having a motor unit comprising a stator and a rotor integrated in said housing, having a rotor position sensor circuit board for at least indirectly detecting at least ore rotor position, and also having an actuator torque sensor circuit board for at least indirectly detecting at least one torque is arranged between the two stabilizer halves.

Each wheel axle of a motor vehicle usually has a roll stabilizer which operates in accordance with the torsion bar principle. The rail stabilizer is arranged substantially parallel to the vehicle axis and, at both ends, is connected to the wheel suspension system via a respective coupling rod. Furthermore, the roll stabilizer is provided for stabilizing the vehicle body against undesired rolling movements about the longitudinal axis of the motor vehicle. Rolling movements of this kind occur, for example, when the motor vehicle is traveling around a corner or on rough terrain.

BACKGROUND

The prior art discloses roll stabilizers having one or more sensors with which operation-specific measurement variables can be detected and monitored. The sensors are usually designed in such a way that each sensor has a separate evaluation electronics system on a circuit board which is preferably arranged in the roll stabilizer at the location of the measurement variable to be ascertained.

For example, DE 10 2011 078 819 A1 discloses a split roll stabilizer of a motor vehicle, it being possible for an actuator which is active for a torsion of the stabilizer parts to be arranged between the two stabilizer parts of said split roll stabilizer. In this case, a sensor is provided for ascertaining a torsional moment which acts in the stabilizer parts.

Furthermore, WO 2007054489 A1 discloses a roll stabilizer for the chassis of a motor vehicle, which roll stabilizer actively counteracts rolling of the body of the motor vehicle. An actuator is provided for actuating a stabilizer element with an electric motor in the roll stabilizer, wherein an actuating signal for the actuator is generated from a rotation angle signal of the electric motor and from a position signal which indicates a position of the stabilizer element. The rotor position is ascertained mainly with the aid of Hall sensors or else optoelectronic methods. Here, the motor is preferably designed as a brushless DC motor, the rotor of which consists of permanent magnets and the stator of which consists of a plurality of electromagnets. The position of the rotor is continuously measured and the electromagnets in the stator are correspondingly commutated, wherein the rotor position is ascertained mainly with the aid of Hall sensors or else optoelectronic methods.

SUMMARY

This disclosure provides an electromechanical roll stabilizer of a motor vehicle and, in particular, to optimize the sensor system for detecting physical measurement variables and as a result reduce installation space and costs of production.

An electromechanical roll stabilizer according to this disclosure for a motor vehicle comprises a first stabilizer half and a second stabilizer half, wherein a housing having a motor unit comprising a stator and a rotor integrated in said housing, having a rotor position sensor circuit board for at least indirectly detecting at least ore rotor position, and also having an actuator torque sensor circuit board for at least indirectly detecting at least one torque is arranged between the two stabilizer halves, wherein the motor unit further has an output shall which is connected to the rotor, wherein the output shaft is at least indirectly connected to the second stabilizer half, wherein the actuator torque sensor circuit board has a torque sensor for sensing the torque between the two stabilizer halves and has a digitization and transmission unit for digitizing the sensed torque and for transmitting the digitized torque to a data forwarding module which is arranged on the rotor position sensor circuit board, wherein the rotor position sensor circuit board has a rotor position detection unit for sensing and digitizing the rotor position and has a data processing unit, wherein the sensing of the rotor position can be triggered by at least one command signal of a controller to the rotor position detection unit, wherein the data processing unit is provided for processing the sensed measurement variables, wherein the data processing unit and the data forwarding module are connected to a communications module in order to forward the digitized measurement variables front the data forwarding module and also the digitized and or processed measurement variables of the data processing unit to the communications module, wherein the communications module is provided firstly for transmitting the digitized measurement variables and/or the processed measurement variables to a controller and secondly for transmitting command signals of the controller to the rotor position sensor circuit board for triggering a targeted measurement of the rotor position.

The motor unit is to be understood to mean an electric motor or electromechanical drive comprising the stator and the rotor. The motor unit is provided for generating a torque between the two stabilizer halves. The output shad or rotor shaft which is connected to the rotor is at least indirectly connected to the second stabilizer half in order to generate a torque between the two stabilizer halves when the motor unit is operated. In addition, the rotor shaft can also be connected to the second stabilizer half via a transmission. An elastomeric coupling can further be fitted between the transmission and the second stabilizer half. According to a preferred exemplary embodiment, a first holding element for at least partially receiving the rotor position circuit board is arranged on the motor unit, wherein the first holding element is at least indirectly connected to the motor unit in a rotationally fixed manner. In this case, the rotor position circuit board is connected to the first holding element via one or more, e.g., two webs. The output shaft is guided through an opening in the first holding element. As an alternative, the rotor position circuit board can be directly connected to the motor unit via the webs.

The actuator torque sensor circuit board comprises both the torque sensor and also a digitization and transmission unit, wherein all components which comprise the actuator torque sensor circuit board can be arranged on a carrier element. The torque sensor determines the torque between the two stabilizer halves. In other words, the actuator torque sensor circuit board is a circuit board tor data detection on which only the measured physical variables are digitized by the digitization and transmission unit and transmitted to the data forwarding module via a data flow, wherein the data processing unit and the data forwarding module are arranged on the rotor position sensor circuit board.

The rotor position sensor circuit board has, in addition to further sensor elements, the evaluation electronics system which is required for further data processing and which can also be called a microcontroller. The entire evaluation electronics system is preferably arranged on a carrier element in order to simplify assembly. In other words, the rotor position sensor circuit board is an intelligent circuit board since both data forwarding of the digitized measurement variables received by the actuator torque sensor circuit board and also data forwarding of the measurement variables received by the rotor position detection unit take place here. The rotor position detection unit is designed in such a way that it can both sense measurement variables and also can digitize and transmit these measurement variables. Data processing of digitized measurement variables to form time-dependent measurement variables can optionally also take place on the rotor position sensor circuit board. A rotor position transmitter is preferably arranged at the sensor-side end of the output shaft, wherein the rotor position detection unit detects the relative rotor position by way of interaction with the rotor position transmitter. In other words, the measurement variables are passed to the data forwarding module in each ease and can additionally be transmitted to the data processing unit in order to process the digitized measurement variables to form time-dependent measurement variables there. As an alternative, the digitized measurement variables can be transmitted only as far as the controller via the data forwarding module and processed to form time-dependent measurement variables there.

The term "digitization" is to be understood to mean that analog measurement values, which have been detected by sensor elements for example in the form of an electrical signal or a voltage, can be converted into a digital data stream by a converter and or further conversion electronics systems. This data stream renders possible the transmission of the data to an evaluation or processing unit where the digital measurement variables can be stored or else processed further in packetized form or transformed back into electrical signals or voltages.

The disclosure includes the technical teaching that a second holding element for at least partially receiving the actuator torque sensor circuit board is arranged on the first stabilizer half of the roll stabilizer, wherein the second holding element is at least indirectly connected to the first stabilizer half in a rotationally fixed manner. The torque which is generated by operation of the motor unit or a torque which is applied from the outside, for example by an external action of force of the road on the vehicle, between the two stabilizer halves can be determined via the torque sensor. The digitized measurement variables which are received by the actuator torque sensor circuit board are forwarded to the communications module via the data forwarding module. The digital rotor position which is detected via the rotor position detection unit can optionally be processed by the data processing unit on the rotor position sensor circuit board by way of the digital rotor position being depacketized and buffer-stored, and being converted into a rotor speed and a rotor acceleration depending on time. This can take place both on the data processing unit and also in the controller. Command signals which are generated by the controller are used for this purpose. The command signals are trigger signals which trigger a measurement of a sensor. The command signals can additionally also be alternative commands. At least one trigger signal is required for the rotor position detection. The torque sensor can optionally also receive a trigger signal for carrying out a measurement of the measurement variable, or measures measurement variables continuously or cyclically. The command signals are forwarded to the data processing unit at specific times along a command data stream via the communications module. Each sent command signal causes a measurement of the rotor position. Owing to the likewise known time of the measurement, time-dependent measurement variables can thereby be ascertained from the initially digitized measurement variables. This means that the rotor position is preferably ascertained at specific times, wherein the torque and also the motor temperature are detected continuously.

The rotor position sensor circuit board preferably has an interface for temperature detection. The interface is connected, for example, to a temperature sensor which is arranged directly on the motor unit or in the immediate region of the motor unit for the purpose of detecting a motor temperature. Therefore, the temperature detection, for example in the form of a voltage, is carried out by the actuator torque sensor circuit board. Therefore, the state of the motor unit during operation is monitored via the temperature sensor in order to avoid, for example, overheating of and consequently damage to the motor unit.

The data forwarding module is provided for forwarding the measurement variables arriving from the digitization and transmission unit of the actuator torque sensor circuit board to the communications module. The communications module further receives the digitized measurement variables of the rotor position detection unit, and of the temperature sensor, and optionally provides the converted time-dependent measurement variables of the rotor position sensor circuit board. Therefore, the sensor signals of rotor position, rotor speed, rotor acceleration, torque and motor temperature are brought together in the communications module and combined into a data stream to the controller, where the data is evaluated for operation of the roll stabilizer. As a result, it is possible, for example, to influence the stiffness of the roll stabilizer during driving, or to react to external influences, such as an uneven road surface for example.

Owing to a refinement of this kind of the sensor arrangement, the sensor functions of rotor position, motor temperature and torque can be combined in a meaningful manner, as a result of which firstly installation space, but in particular costs, can be saved. This is reflected substantially in the avoidance of double functions on account of physical interfaces which are no longer required being dispensed with. Therefore, the digitized measurement variables of a plurality of sensor circuit boards can be transmitted to the controller in a manner channeled and bundled in the communications module. This furthermore shortens signal propagation times on account of saved or combined data streams.

A measurement variable which can be at least indirectly detected is to be understood to mean a detectable measurement variable which is detected either directly, that is to say without intermediaries, or via at least one further component or element, for example via a receiving element, which is connected to the respective sensor element.

In accordance with a method for determining at least a rotor position and a torque of an electromechanical roll stabilizer, the torque between two stabilizer halves of the roll stabilizer is detected via a torque sensor which is arranged on an actuator torque sensor circuit board, wherein the measured torque is digitized by a digitization and transmission unit and transmitted to a data forwarding module which is arranged on a rotor position sensor circuit board, wherein a data processing unit for processing the digitized measurement variables of the actuator torque sensor circuit board to form lime-dependent measurement variables is further arranged on the rotor position sensor circuit board, wherein the rotor position is detected and digitized via a rotor position detection unit which is arranged on the rotor position sensor circuit board, w herein the digitized measurement variables are transmitted both to the data forwarding module and also optionally to the data processing unit, wherein the sensing of the rotor position is triggered by at least one command signal of a controller to the rotor position detection unit, wherein the time-dependent measurement variables and the digitized measurement variables of the data processing unit and also the digitized measurement variables of the data forwarding nodule are forwarded to a communications module, wherein the measured measurement variables and or the processed measurement variables are transmitted by the communications module to the controller, and wherein command signals are transmitted by the controller, via the communications module, to the rotor position detection unit in order to trigger a targeted measurement of the rotor position.

In other words, the digitized measurement variables are transmitted from the actuator torque sensor circuit board, via a data stream, to the rotor position sensor circuit board. The signal data of the rotor position detection unit are processed and converted in the data processing unit, wherein the digitized data in the data forwarding module are forwarded in unprocessed form. The measurement of the rotor position takes place for each command signal, which starts from the controller and is passed via the evaluation electronics system, that is to say to the communications module and the data processing unit, in order to trigger a measurement of the rotor position at a specific time at the rotor position detection unit. As a result, the above-described time-dependent measurement variables can be calculated in the data processing unit. The controller is preferably external, that is to say arranged outside the roll stabilizer. However, it is also conceivable to arrange the controller in the roll stabilizer. In addition, gateway functions can be provided on the rotor position sensor circuit board and/or on the actuator torque sensor circuit board, wherein further circuit boards for sensing further measurement variables can be connected to the existing sensor circuit boards.

The rotor position sensor circuit board preferably further comprises an interface for temperature detection, wherein the measurement variable of the temperature is transmitted via the data processing unit and the communications module to the controller. As an alternative, the temperature sensor can also be arranged on the actuator torque sensor circuit board, wherein the measured measurement variables are then digitized by the digitization and transmission unit and passed to the data forwarding module or as far as the communications module for combining all digitized measurement variables.

The method can be executed, in particular, by a computer or by the control and evaluation apparatus. Therefore, the method can be implemented as software. In this respect, the corresponding software is a product which can be purchased separately. Therefore, the invention also relates to a computer program product with machine-readable instructions which, when they are executed on a computer or on a controller, upgrade the computer and/or the controller to form a control logic system of the roll stabilizer or prompt said computer and/or controller to execute a method according to the invention.

In particular, the roll stabilizer according to the invention is used in a motor vehicle. A motor vehicle is to be understood to mean a vehicle which, depending on its design and its particular installations which are permanently linked to the vehicle, to convey people or goods. By way of example, a motor vehicle is to be understood to mean a passenger vehicle or a heavy goods vehicle.

BRIEF DESCRIPTION OF THE DRAWINGS

Further measures will be explained in more detail below together with the description of exemplary embodiments with reference to the five figures, wherein identical or similar elements are provided with the same reference symbol, where.

DETAILED DESCRIPTION

Figure 1:
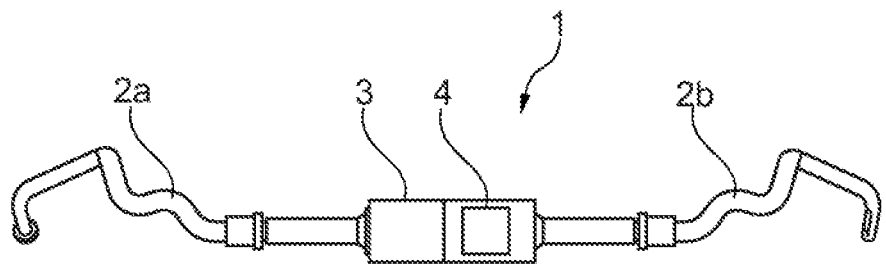
FIG. 1 shows a schematic view of a roll stabilizer according to an embodiment.

According to FIG. 1, an electromechanical roll stabilizer 1 for a motor vehicle—not illustrated here—comprises a first stabilizer half 2a and a second stabilizer half 2b, which stabilizer halves can be connected to one another via a housing 3, which is arranged between the two stabilizer halves 2a, 2b, and a motor unit 4 which is arranged within the housing 3. The roll stabilizer 1 is arranged transversely to the vehicle longitudinal axis and, at its free ends, is connected to the wheels or wheel carriers—not illustrated here.

Figure 2:
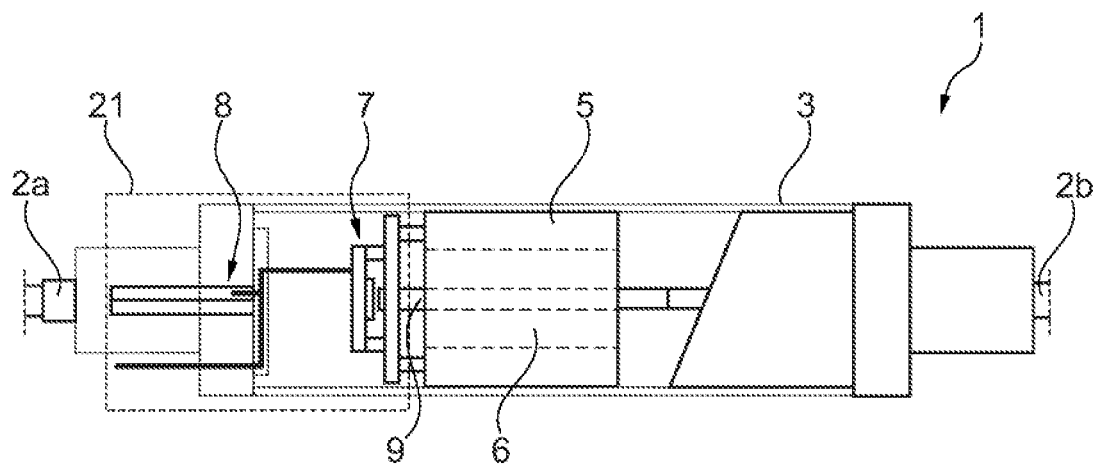
FIG. 2 shows a simplified schematic partially sectioned illustration in the region of a housing of the roll stabilizer according to an embodiment.

According to FIG. 2, the housing 3 of the roll stabilizer 1 is illustrated in a partially sectioned manner. The motor unit 4 has a stator 5 and a rotor 6, wherein the rotor 6 is connected in an interlocking manner to an output shall 9. The output shall 9 has, on the sensor side, a free end and is connected in a rotationally fixed manner to the second stabilizer half on the opposite side of the motor unit 4 at a second end—not illustrated here. A sensor arrangement 21 is further arranged within the housing 3, said sensor arrangement having a rotor position sensor circuit board 7 for indirectly detecting at least one rotor position and also having an actuator torque sensor circuit board 8 for indirectly detecting a torque and for directly detecting a motor temperature.

Figure 3:
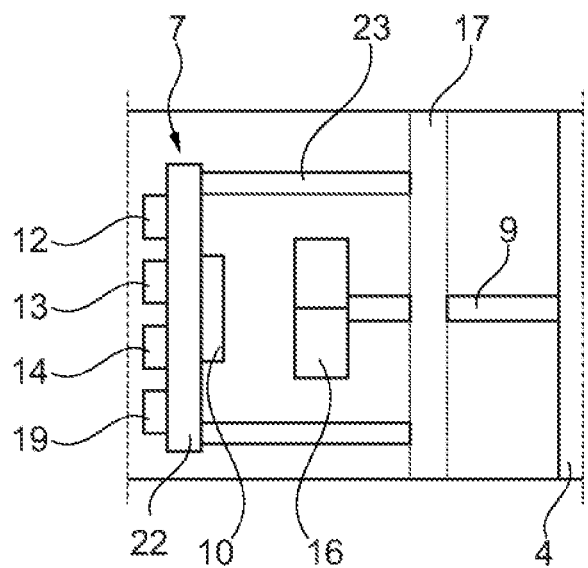
FIG. 3 shows a simplified schematic sectional illustration for explaining the structure of a rotor position sensor circuit board of the roll stabilizer according to an embodiment.

FIG. 3 illustrates the rotor position sensor circuit board 7 of the sensor arrangement 21 of the roll stabilizer 1 according to the embodiment shown in FIG. 1. The rotor position sensor circuit board 7 comprises a carrier element 22 on which a rotor position detection unit 10 for sensing the rotor position and also a data processing unit 12 for processing and forwarding digitized measurement variables are arranged. An interface 19 for temperature detection, a data forwarding module 13 and a communications module 14 are further arranged on the carrier element 22. In the present case, the rotor position sensor circuit board 7 is connected to a first holding element 17 via two webs 23. The first holding element 17 is connected to the motor unit 4 and provided for receiving the rotor position sensor circuit board 7. A rotor position transmitter 16 is arranged axially opposite the rotor position detection unit 10 at the sensor-side end of the output shaft 9. Owing to rotation of the output shaft 9 and therefore also the rotor position transmitter 16, the rotor position detection unit 10 can detect tire relative rotor position between the rotor position detection unit 10 and the rotor position transmitter 16 for determining the rotor position. In addition, the rotor position sensor circuit board 7 can have further interfaces in order to be able to be connected to additional circuit boards—not illustrated here—for sensing physical measurement variables.

Figure 4:
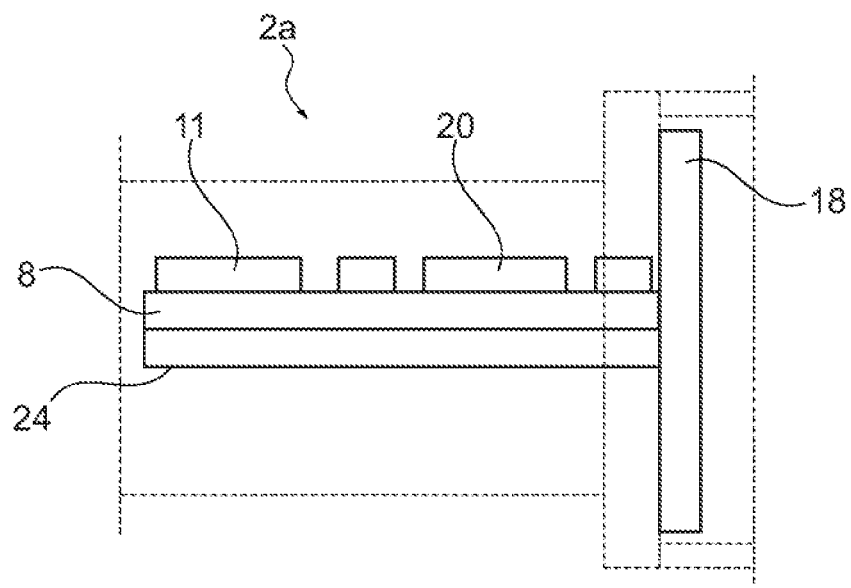
FIG. 4 shows a simplified schematic sectional illustration for explaining the structure of an actuator torque sensor circuit board of the roll stabilizer according to an embodiment.

FIG. 4 illustrates the actuator torque sensor circuit board 8 of the sensor arrangement 21. A second holding element 18 for receiving the actuator torque sensor circuit board 8 is arranged on the first stabilizer half 2a, wherein the second holding element 18 is connected in a rotationally fixed manner to the first stabilizer half 2a. The actuator torque sensor circuit board 8 comprises a earner element 24 on which a torque sensor 20 for sensing the torque between the two stabilizer halves 2a, 2b and a digitization and transmission unit 11 for digitizing the sensed torque are arranged. In addition, the actuator torque sensor circuit board 8 can have further interfaces in order to be connected to additional circuit boards for sensing physical measurement variables.

Figure 5:
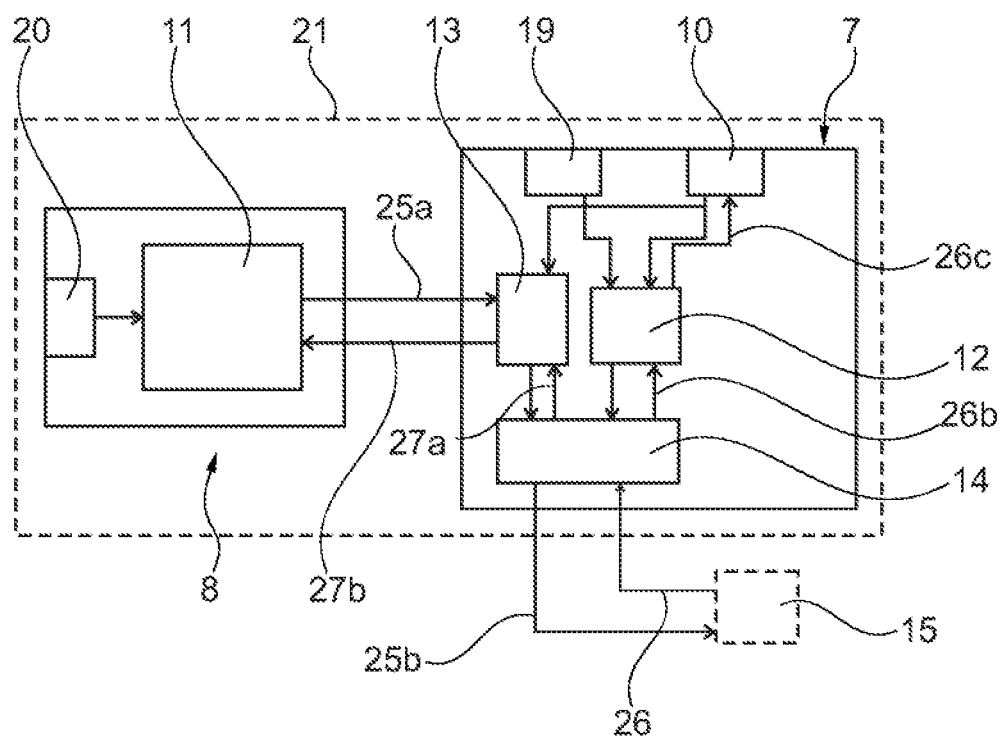
FIG. 5 shows a schematic block diagram for explaining a sensor arrangement of the roll stabilizer according to an embodiment.

FIG. 5 shows the sensor arrangement 21 in the form of a block diagram. The measurement variables of the torque which are sensed by the torque sensor 20 and digitized via the digitization and transmission unit 11 are forwarded to the data forwarding module 13 via a first data stream 25a. The data processing unit 12 optionally receives measurement variables which are optionally measured by the rotor position detection unit 10 and the interlace 19 and are detected in the form of voltages or changes in voltage or else as electrical signals, and digitized. The rotor position which is digitally measured by the rotor position detection unit 10 is depacketized and processed in the data processing unit 12 and converted to form a rotor acceleration and a rotor speed and digitized again. The measurement variables of the interface 19 are further digitized in the data processing unit 12 for forwarding purposes. It is possible to determine and to monitor the torque between the two stabilizer halves 2a, 2b via the torque sensor 20. The temperature sensor 19 is provided for detecting and monitoring a motor temperature. The data forwarding module 13 is provided for directly forwarding, without processing, the measurement variables of the torque which is measured in the actuator torque sensor circuit board 8. The digitized and/or processed measurement variables of the data processing unit 12 and the digitized measurement variables of the data forwarding module 13 are then transmitted to the communications module 14 and combined there.

The communications module 14 is provided for receiving the digitized and/or processed measurement variables of the data processing unit 12 and of the data forwarding module 13 and for forwarding said measurement variables to a controller 15 via a second data stream 25b. In the present case, the controller 15 is arranged outside the roll stabilizer 1 and is connected to the communications module 14 via a cable connection for example. The communications module 14 receives command signals from the controller 15 via a first command data stream 26a. The command signals are sent to the rotor position detection unit 10 at specific and predefined times directly via the communications module 14 and the data processing unit 12 along a second and third command data stream 26b, 26c. The command signals cause the rotor position to be measured at desired times via the rotor position detection unit 10, wherein the digital rotor position is transmitted to the controller via the data forwarding module 13 and the communications module 14. The time-dependent rotor acceleration and rotor speed are further optionally calculated in the data processing unit 12 from the digitized time-independent measurement variables of the rotor position. In addition, it is conceivable for a further command signal to be passed to the torque sensor 20 via the communications module 14 and the data forwarding module 13 in order to trigger a measurement of the torque at a specific time or at several defined times.

Furthermore, the first command data stream 26a of the controller 15 optionally triggers a measurement of the torque, wherein the first command data stream 26a is passed along a first and second torque command data stream 27a, 27b via the communications module 14 and the data forwarding module in this ease. Therefore, a measurement of the torque via the torque sensor 20 can be triggered by every command signal of the controller 15.

LIST OF REFERENCE SYMBOLS

1 Roll stabilizer
2a, 2b Stabilizer half
3 Housing
4 Motor unit
5 Stator
6 Rotor
7 Rotor position sensor circuit board
8 Actuator torque sensor circuit board
9 Output shaft
10 Rotor position detection unit
11 Digitization and transmission unit
12 Data processing unit
13 Data forwarding module
14 Communications module
15 Controller
16 Rotor position transmitter
17 First holding element
18 Second holding element
19 Interface
20 Torque sensor
21 Sensor arrangement
22 Carrier element
23 Web
24 Carrier element
25a, 25b Data stream
26a, 26b, 26c Command data stream
27a, 27b Torque command data stream

The invention claimed is:
1. An electromechanical roll stabilizer for a motor vehicle, comprising:
a first stabilizer half;
a second stabilizer half;
a housing having a motor unit that includes a stator, a rotor, and an output shaft connected to the rotor, wherein the output shaft is at least indirectly connected to the second stabilizer half;
a rotor position sensor circuit board configured to detect at least one rotor position, the rotor position sensor circuit board having a data forwarding module;
an actuator torque sensor circuit board arranged between the first stabilizer half and the second stabilizer half and configured to (i) detect torque between the first stabilizer half and the second stabilizer half, and (ii) transmit the detected torque to the data forwarding module of the rotor position sensor circuit board; and a processor configured to process the detected rotor position, wherein the processor and the data forwarding module are connected to a communications module in order to forward the detected torque from the data forwarding module to the communications module, wherein the communications module is configured to (i) transmit the detected torque to a controller, and (ii) transmit command signals from the controller to detect the at least one rotor position via the rotor position sensor circuit board.

2. The electromechanical roll stabilizer of claim 1, wherein the rotor position sensor circuit board further has a temperature sensor configured to detect a temperature of the rotor.

3. The electromechanical roll stabilizer of claim 2, wherein the temperature sensor is configured to continuously detect the temperature of the rotor and the processor is configured to utilize the rotor position sensor circuit board to selectively detect the at least one rotor position.

4. The electromechanical roll stabilizer of claim 2, further comprising a rotor position transmitter arranged at a sensor-side end of the output shaft, wherein the rotor position sensor circuit board detects the at least one rotor position via interaction with the rotor position transmitter.

5. The electromechanical roll stabilizer of claim 2, further comprising a first holding element arranged on the motor unit and configured to at least partially receive the rotor position sensor circuit board, wherein the first holding element is at least indirectly connected to the motor unit in a rotationally fixed manner.

6. The electromechanical roll stabilizer of claim 5, further comprising a second holding element arranged on the first stabilizer half and configured to at least partially receive the actuator torque sensor circuit board, wherein the second holding element is at least indirectly connected to the first stabilizer half in a rotationally fixed manner.

\* \* \* \* \*